Oct. 1, 1957  G. E. CARON  2,808,295
AUTOMATIC SILO SPREADER WITH DRIVEN SPOUT SUSPENDING RACE MEMBER
Filed Feb. 14, 1955  2 Sheets-Sheet 1
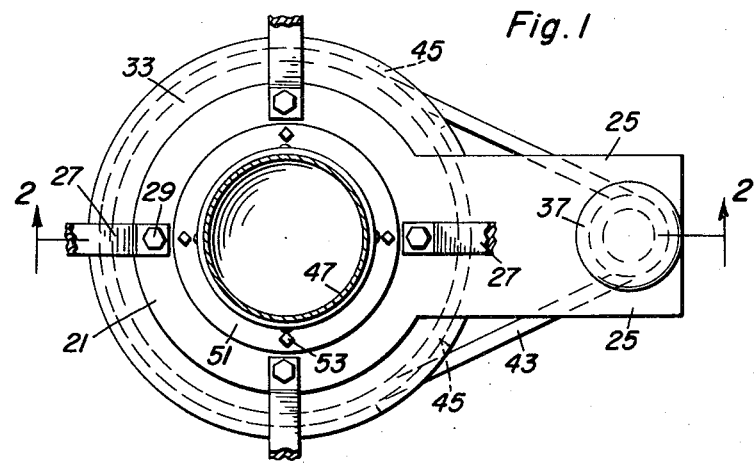
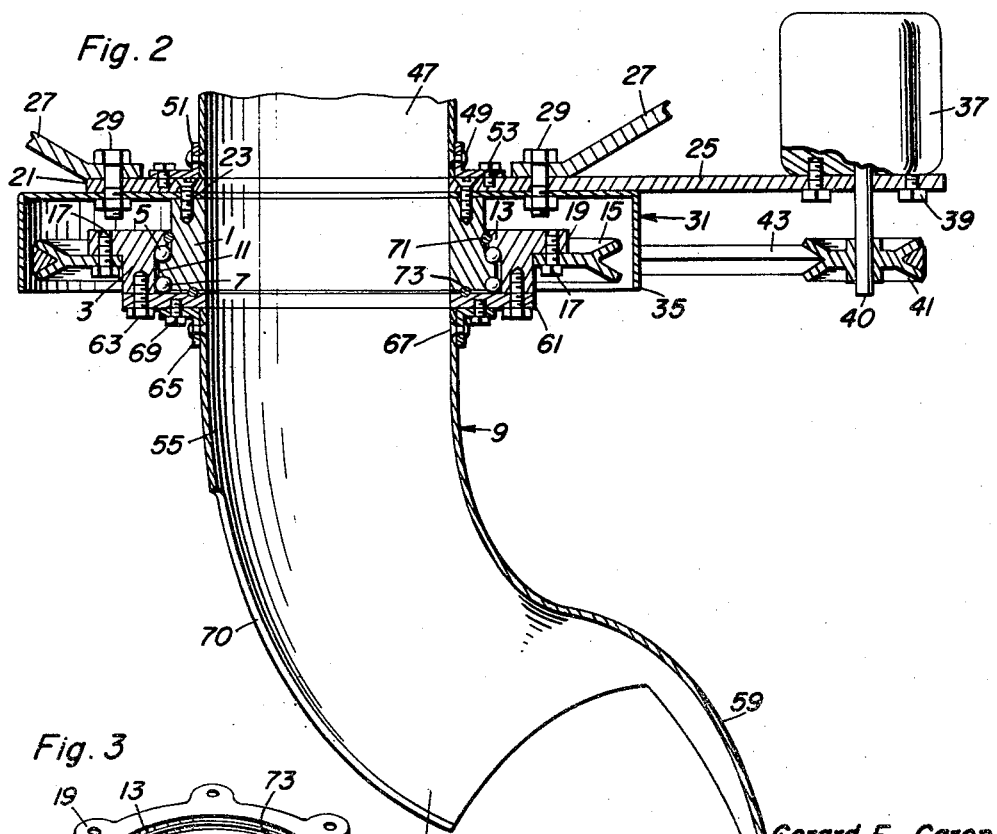
Gerard E. Caron
INVENTOR.

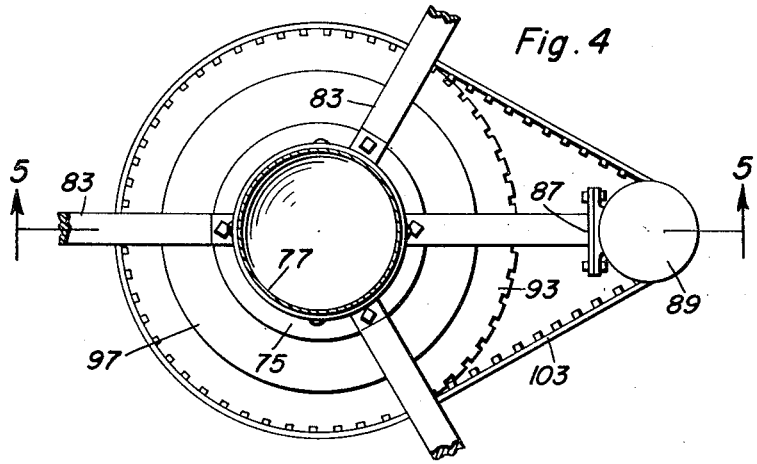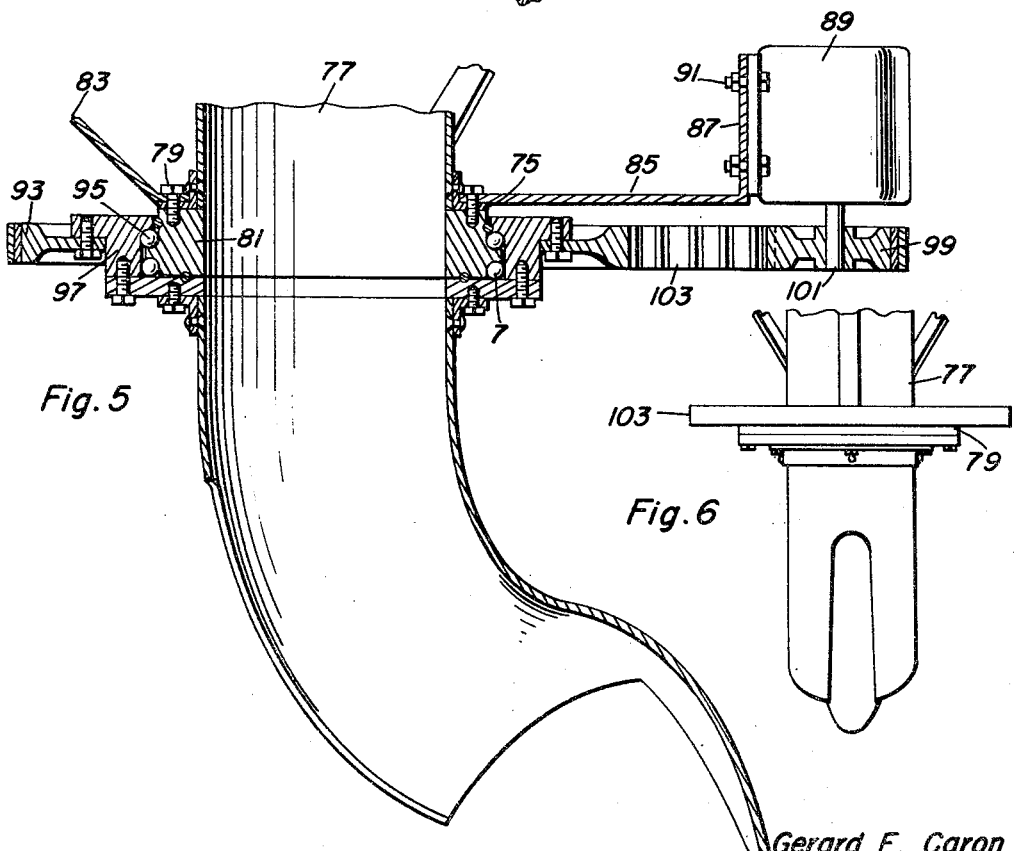

United States Patent Office 2,808,295
Patented Oct. 1, 1957

2,808,295

AUTOMATIC SILO SPREADER WITH DRIVEN SPOUT SUSPENDING RACE MEMBER

Gerard E. Caron, Westford, Vt.

Application February 14, 1955, Serial No. 487,877

9 Claims. (Cl. 302—60)

My invention relates to improvements in automatic bin spreaders of the revolving discharge nozzle type forming the subject matter of my co-pending application Serial No. 339,277, filed February 27, 1953, now abandoned.

An important object of my invention is to provide in such a spreader improved antifriction means for suspending and revolving the nozzle and which will offset tendency of the nozzle to whip and tilt during rotation and will thereby reduce to a minimum friction and tendency to binding in the suspension means.

Another object is to provide means for sealing the suspending and rotating means against leaking grease in the bin or silo.

Still another object is to provide a more stable suspending means for the nozzle and to provide a motor drive for the suspending and revolving means which will not tend to tilt the nozzle.

Still another object is to provide a stronger and more durable suspending and revolving means without increasing the cost of manufacture.

Yet another object is to increase the efficiency of the nozzle as regards spreading.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in plan partly in section of my improved automatic spreader in the preferred embodiment thereof;

Figure 2 is an enlarged fragmentary view in vertical section taken on the line 2—2 of Figure 1;

Figure 3 is a view on a smaller scale of an outer race member forming part of the suspending and rotating means;

Figure 4 is a view in plan partly in section of a modified embodiment of the automatic spreader;

Figure 5 is an enlarged fragmentary view in vertical section taken on the line 5—5 of Figure 4, and Figure 6 is a view rear elevation drawn to a smaller scale of the modified embodiment.

Referring to the drawings by numerals, according to the preferred embodiment of my invention, illustrated in Figures 1 to 5, the suspending and rotating means comprises as its principal parts an inner annular race member 1 internally flat and adapted to be suspended in a horizontal position from the top of a silo, not shown, an outer annular revolving race member 3, upper and lower series 5, 7 of ball bearings between said members 1, 3 and means presently described for attaching the nozzle 9 in suspended position to said outer race member 3 for revolving thereby.

The inner race member 1 embodies a medial circumferential, external flange 11 separating the upper and lower series 5, 7 of ball bearings, and supporting the upper series 7 of ball bearings.

The outer race member 3 embodies an internal, upper edge, circumferential flange 13 running on the upper series 5 of ball bearings 5 on which the outer race member 3 is thereby suspended. A V-grooved annular pulley 15 fitting around the outer race member 3 is detachably attached to said member 3 by lug bolts 17 extending upwardly into circumferentially spaced apertured ears 19 outstanding from said outer face of said member 3.

Means for suspending the inner race member 1 comprises an annular flat crown plate 21 surmounting said race member 1 concentrically and of the same internal diameter as said member 1 and bolted to said member 1 by machine screws 23. The crown plate 21 is provided with a radial rectangular arm 25 for a purpose presently explained. A series, preferably four, of hanger bars 27 are bolted, as at 29, on top of said crown plate 21 at the outer edge thereof and in 90° angular relation and diverge upwardly therefrom for attachment in any suitable manner to the top of a silo.

A guard 31 with an annular flat top 33 of the same internal diameter as that of the race member 1 and provided with a circular depending flange 35 has its top 33 interposed between the crown plate 21 and the inner race member 1 concentrically thereof and secured thereto by the screws 23 and bolts 29 so that its flange 35 surrounds the pulley 15 and said race members 1, 3.

Drive means for the pulley 15 for rotating the outer race member 3 comprises an electric motor 37 bolted, as at 39, on top of the outer end of the arm 25 with its armature shaft 40 depending through said arm 25 and provided with smaller V-grooved pulley 41 fast thereon in the plane of the pulley 15 and drivingly connected to said pulley 15 by a V-belt 43 running through suitable openings in the flange 35 and illustrated at 45 by dotted lines in Figure 1.

A coupling sleeve 47 as in my co-pending application and of the same diameter internally as that of the race member 1 rises therefrom concentrically thereof for coupling to a grain supply feed pipe not shown. The sleeve 47 has its lower end fitted in and riveted, as at 49, to an attaching ring 51 of angle cross section bolted as at 53, on top of the crown plate 21.

The discharge nozzle 9 is the same, with the exceptions presently noted, as in my co-pending application in that it comprises a cylindrical portion 55 having a laterally curved offset lower end 57 for discharging grain or the like outwardly in a circle as said nozzle is revolved and which terminates in a downwardly extending concavo-convex deflector finger 59 for throwing some of the grain toward the center of a silo. According to the instant invention, the portion 55 is of the same internal diameter as that of the inner race member 1 and is attached to the bottom of the outer race member 3 concentrically of the inner member 1 by means of a flat attaching ring 61, also of the same internal diameter as member 1, bolted as at 63 to the bottom of the outer race member 3, said section 55 being secured at its upper end to said ring concentrically thereof by a ring member 65 of angular cross section in which said section is riveted, as at 67, and which is bolted as at 69, to said ring 61. A longitudinal downwardly flaring slot 70 in said section 55 diametrically opposite the finger 59 provides for the escape of grain from that side of said nozzle to spread the grain.

The sealing means comprises an oil seal wire ring 71 suitably interposed between the inner and outer race members 1, 3 above the upper series 5 of ball bearings and another sealing ring 73 interposed between the bottom of the inner race member and the attaching ring 61.

In the modified embodiment shown in Figures 4, 5 and 6 the construction and arrangement of parts is the same as in the preferred embodiment with the following exceptions. The attaching ring 75 for the coupling sleeve 77 is bolted, as at 79, directly on top of the inner race member 81. The hanger bars 83 are arranged in 120° angular relation and secured to the attaching ring 75, by the bolts 79. A motor supporting arm 85 is secured by one of the bolts 79 to said ring 75 radially of the ring 51 and provided with an upturned outer end 87 to which the motor 89 is bolted as at 91. Further, a cogged pulley 93 is bolted, as at 95, to the outer race member 97 and a cogged pinion 99 fixed to the armature shaft 101 of the motor 89 and drivingly connected to the pulley 93 by a cogged belt 103 to prevent slipping in the drive to the outer race member 3.

As will now be seen, the outer race member 3 is rotated to rotate the nozzle 9 and said outer race member 3 is stabilized against tilting by the upper and lower series of ball bearings to prevent whipping of the nozzle 9; the series of ball bearings being confined by the race members 1, 3 in widely separated relation for stabilizing the outer race member 1 and running between grease seals for effective lubrication of the bearings and race members. Further, since the nozzle 9 is carried by the outer race member 97 it is stabilized against whipping more effectively than in my co-pending application.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A spreader for filling silos and bins with feed comprising a discharge nozzle, and means for suspending and rotating said nozzle in vertical position comprising an inner horizontal annular race member, an outer horizontal annular race member surrounding said inner member, said members being coplanar and having inner and outer confronting circumferential faces and upper and a lower series of anti-friction balls confined between said confronting faces of said race members, the upper series underlying and rotatably suspending said outer race member, means attaching said nozzle at its upper end to the bottom of said outer race member concentrically of said inner race member and supporting said lower series of antifriction balls, a support member surrounding and fixed on top of said inner race member and extending radially therefrom, a motor carried by said support member, and a belt and pulley drive between said motor and outer race member coplanar with the outer race member.

2. The combination of claim 1 said first named means comprising an annular plate detachably attached to the bottom of said outer race member concentrically thereof for rotation thereby and having a flat top underlying said inner race member and supporting the lower series of said balls and said nozzle.

3. The combination of claim 1, said support member comprising an annular crown plate concentric to said inner race member and having a radial arm supporting said motor.

4. The combination of claim 1 said drive comprising an annular pulley surrounding and fixed to said outer race member.

5. The combination of claim 1, said drive comprising cogged pulleys on said motor and outer race member, respectively, and a cogged belt trained around said pulleys.

6. The combination of claim 4 and a coupling sleeve rising from and fixed to said support member concentrically thereof for passing feed through said inner race member to said nozzle.

7. The combination of claim 3 and hanger bars rising from and fixed to said crown plate.

8. The combination of claim 1 and hanger bars rising from and fixed to said inner race member.

9. A spreader for filling silos and bins with feed comprising a discharge nozzle, and means for suspending and rotating said nozzle in vertical position comprising an inner horizontal annular race member, an outer horizontal annular race member, said outer horizontal race member surrounding said inner race member, and upper and a lower series of anti-friction balls between said race members, the upper series rotatably suspending said outer race member, means attaching said nozzle at its upper end to the bottom of said outer race member concentrically of said inner race member, a support member surrounding and fixed to said inner race member and extending radially therefrom, a motor carried by said support member, and a belt and pulley drive between said motor and outer race member, said nozzle having a vertical downwardly flaring slot in one side thereof for discharging feed out of the same.

References Cited in the file of this patent

UNITED STATES PATENTS

| | | |
|---|---|---|
| 2,010,312 | McIntire | Aug. 6, 1935 |
| 2,449,592 | Daddario | Sept. 21, 1948 |

FOREIGN PATENTS

| | | |
|---|---|---|
| 669,358 | France | Aug. 3, 1929 |